3,152,185
METHOD OF PREPARING TERTIARY AMINES
Andrejs Zvejnieks, Kankakee, Ill., assignor to General
Mills, Inc., a corporation of Delaware
No Drawing. Filed Feb. 27, 1959, Ser. No. 795,908
5 Claims. (Cl. 260—583)

The present invention relates to a method of preparing aliphatic tertiary amines, and more particularly to the preparation of tertiary amines which contain from 6–26 carbon atoms in each aliphatic group.

The tertiary amines which are obtained by the practice of the present invention may be used as extracting agents for valuable metals, additives to lubricant and fuel mixtures and for a wide variety of other uses which find the physical and chemical properties of these tertiary amines advantageous.

In the past, tertiary amines containing 6 or more carbon atoms in each aliphatic group have been prepared in only small quantities by what are generally considered to be commercially inapplicable methods. Of the methods described in the literature for preparing tertiary amines of this type, the reaction of higher secondary amines with an excess of higher alkyl halides is usually recommended as the preferred method of preparation. The high cost of the higher alkyl halides and the additional expense of further treating the amines so formed to remove the halide ion and other impurities makes this method impractical for the preparation of large amounts of tertiary amines. Still another method described in the literature for preparing tertiary amines of this type has been by the hydrogenation of higher aliphatic nitriles in the presence of a hydrogenation catalyst. Invariably the literature describes this method as yielding mixtures which contain predominantly primary and secondary amines and only minute amounts of tertiary amines.

It is an object of the present invention to disclose a process of preparing aliphatic tertiary amines which contain 6–26 carbon atoms in each aliphatic group in yields up to and in excess of 85% tertiary amines.

It is a further object of the present invention to disclose a process of preparing aliphatic tertiary amines which utilizes readily available starting materials and results in a high percent of conversion of these starting materials to aliphatic tertiary amines.

Briefly stated, I have made the totally unexpected discovery that yields up to and in excess of 85% of tertiary amines which contain 6–26 carbon atoms in each aliphatic group may be prepared by reacting in the liquid phase a material selected from the group composed of nitriles, mixtures of alcohols and ammonia, mixtures of nitriles and alcohols, and mixtures of secondary amines and alcohols in the presence of hydrogen and a suspended hydrogenation catalyst at a temperature of 160–280° C. and a pressure of 100–200 pounds per square inch, while circulating dry hydrogen through the reaction mixture to remove the water vapor essentially as fast as it is formed.

The nitriles, alcohols and secondary amines contemplated for use in the present invention as starting materials are those compounds which contain from 6–26 carbon atoms in each aliphatic group.

Illustrative of the nitriles which may be used in the present invention are those mixtures of nitriles obtained when the fatty acids of the common oils and fats such as tallow, coconut oil and the like are converted to nitriles by passing the fatty acids and ammonia at a temperature of about 380° C. over a dehydration catalyst. Nitriles of this type are commercially available.

Illustrative of the alcohols contemplated for use in the present invention are those alcohols or mixtures of alcohols prepared by the hydrogenation of the fatty acids or their esters in the presence of a salt or oxide of a metal such as copper, nickel, iron, cobalt or similar. The readily available commercial mixtures of fatty aliphatic alcohols are especially well suited for use in the present invention because of their economical nature.

Illustrative of the secondary amines which may be converted to tertiary amines by the present invention are those secondary amines which are prepared by the hydrogenation of the aforementioned fatty nitriles in the presence of hydrogen and a hydrogenation catalyst at 200–250° C. with the venting of the ammonia formed during the reaction.

While I have given examples of materials which are fatty acid derivatives for purposes of illustration the nature of the starting material to be used in the present invention is not so restricted. I find that a wide variety of alcohols, including the branched chain alcohols of the type derived from petroleum products and the polyhydroxyl type alcohols, as well as nitriles and secondary amines may be converted to tertiary amines according to the present invention. The only limitation on the use of compounds of the previously-mentioned types is that they possess a vapor pressure lower than water under the reaction conditions.

While most commercially avialable hydrogenation catalysts are usable in the present invention, I prefer to use the nickel catalysts such as Raney nickel and the like in a form which may readily be suspended in the liquid starting material.

In the preferred practice of the present invention the starting material is charged into a converter equipped with an agitator to which is added the nickel catalyst. The system is then filled with hydrogen and a total pressure of 100–200 pounds per square inch is maintained with hydrogen. The reaction mixture is heated to 160–280° C., preferably 180–220° C., with continued agitation. Dry hydrogen gas is then circulated through the reaction mixture and the water vapor and volatile products formed during the reaction are removed essentially as fast as they are formed by the excess hydrogen. The conditions are maintained until the reaction is essentially completed, usually from 2–12 hours.

When the initial starting material is a mixture of nitriles and alcohol I find it preferable to have 30–60 mol percentage of the nitrile present and the remainder alcohol.

When the initial starting material is a mixture of alcohol and ammonia, I find it preferable to employ an amount of ammonia which is approximately equivalent to 5–20% by weight of the total reactants. While the total amount of ammonia may be initially charged into the converter, the preferred method of introducing the desired amount of ammonia is by circulating the hydrogen gas at the reaction pressure and at a rate of 2–12 standard cubic feet per hour for each pound of alcohol feed through a 20–50% solution of ammonia held at 80–100° F. and into the reaction mixture.

When the initial starting material is a mixture of secondary amines and alcohols, I find it preferable to use at least one mol of alcohol for each mol of secondary amine present. While the total amount of the alcohol may be initially charged into the converter, I find it preferable in most instances to pump the alcohol into the converter at the reaction pressure and temperature as it is being used.

When the initial starting material is a nitrile or mixture of nitriles the entire amount of the nitrile is initially charged into the converter. While substantial yields of tertiary amines are obtained when employing the nitrile or a mixture of nitriles as the sole starting material, I find it preferable to obtain optimum yields to use as the starting material the combination of nitriles and alcohols previously described.

The converter used for these reactions consists of a pressure vessel equipped with an agitator and coils suitable for either heating or cooling. This converter is connected to a device suitable for removing water and/or ammonia from the circulating gases.

The following examples illustrate but do not limit the invention, all precentages being by weight:

Example I 3200 pounds of a mixture of $C_8$ (40%) and $C_{10}$ (60%) nitriles and 4803 pounds of a mixture of n-octyl (40%) and n-decyl (60%) alcohols were charged into the converter and 176 pounds of nickel catalyst in suspendable form was added. The mixture was dried by circulating hydrogen at 180 pounds per square inch at a temperature of 350° F. through the apparatus. The reaction commenced at 380° F. and the temperature was raised to and maintained at 500–520° F. at a hydrogen pressure of 200 pounds per square inch until the reaction was essentially completed in about seven hours. During the entire duration of the reaction hydrogen gas was passed through the reaction mixture and the water vapors formed by the reaction removed with the gas. A small amount (about 200 pounds) of unreacted alcohol and primary amine were stripped off by circulating the gas at the same pressure and temperature. The reactor was then shut down and the product cooled and filtered. The final product weighed 6120 pounds and analyzed 0.3% primary amine, 1.0% secondary amine and 89% tertiary amine.

Example II 230 pounds of a mixture of $C_8$ (40%) and $C_{10}$ (60%) nitriles and 6.5 pounds of Raney nickel catalyst in suspendable form were charged into a converter similar to but smaller than the converter used in Example I. The reaction was conducted in essentially the same manner as in Example I with the following exceptions. The temperature was maintained at 200° C. under a pressure of 185 pounds per square inch while dry hydrogen gas was passed through the reaction mixture at a rate of 2000 standard cubic feet per hour. When a sample of the reaction product analyzed 3.3% primary, 86.6% secondary and 2.1% tertiary amines, 140 pounds of a mixture of n-octyl (60%) n-decyl (40%) alcohol was pumped into the reaction mixture. After about five hours of continued heating at about 200° C. and 185 pounds of pressure per square inch and a gas circulating rate of 2000–2500 standard cubic feet per hour, the final product was analyzed. It contained 0.3% primary, 7.1% secondary and 88.8% tertiary amines.

Example III

The process of Example II was repeated with the following exception: when a sample of the reaction product analyzed 86% secondary amine, the reaction mixture and converter were cooled down and 140 pounds of a mixture of n-octyl (60%) and n-decyl (40%) alcohol was added to the reaction mixture. After about five hours at approximately 200° C. at 185 pounds of pressure per square inch and a gas circulating rate of 2000–2500 standard cubic feet per hour, the mixture analyzed 88% tertiary amine.

Example IV

A mixture of n-octyl (40%) and n-decyl (60%) alcohols was charged into the converter used in Example II together with 6.5 pounds of Raney nickel catalyst in suspendable form. A mixture of 30 pounds of ammonia and 60 pounds of water was placed in the device used for removing water and/or ammonia from the circulating gases. The system was filled with hydrogen and a total pressure of the 150 pounds maintained with hydrogen. Dry hydrogen gas was passed through the device containing the amomnia and water at a rate of 2000 standard cubic feet per hour. While the gas circulation was maintained, the reactor vessel was heated to 250–270° C. with constant agitation. The water formed by the reaction was carried off with the circulating gases. After about four hours reaction time, the product in the converter analyzed 92.3% tertiary amine, 0.3% primary and 2.4% secondary amine.

It will be readily apparent to those skilled in the art that my present invention possesses many advanatges over the prior art. Among those not previously mentioned is the advantage of being able by use of the present invention to produce aliphatic tertiary amines of predictable structure.

This is accomplished by employing secondary amine of known structure as the starting material and N-alkylating the secondary amine with an aliphatic alcohol of definite structure, thereby obtaining a tertiary amine deriving two aliphatic groups from the secondary amine and one aliphatic group from the alcohol.

It is understood that the present invention is intended to cover all changes and modifications of the examples of the invention herein chosen for the purpose of illustration which do not constitute departures from the spirit and scope of the invention.

What I claim is:

1. The method of preparing aliphatic tertiary amines, which contain from 6–26 carbon atoms in each aliphatic group, which comprises reacting in the liquid phase a material selected from the group consisting of aliphatic nitriles, mixtures of aliphatic alcohols and ammonia, mixtures of aliphatic nitriles and aliphatic alcohols and mixtures of aliphatic secondary amines and aliphatic alcohols, which aliphatic compounds contain 6–26 carbon atoms in each aliphatic group and have a vapor pressure less than water in the presence of hydrogen and a hydrogenation catalyst at a temperature of 160–280° C., and a pressure of 100–200 pounds per square inch while circulating hydrogen through the reaction mixture, removing volatile products formed during the reaction from the circulating hydrogen, returning the hydrogen to the reaction mixture, and continuing the reaction until at least about 85% of tertiary amines are obtained.

2. The method of preparing aliphatic tertiary amines which contain from 6–26 carbon atoms in each aliphatic group, which comprises reacting in the liquid phase a mixture of an aliphatic alcohol, containing from 6–26 carbon atoms and having a vapor pressure less than water, and ammonia in the presence of hydrogen and a hydrogenation catalyst, at a temperature of 160–280° C. and a pressure of 100–200 pounds per square inch, while circulating hydrogen through the reaction mixture, removing water from the circulating hydrogen, returning the hydrogen to the reaction mixture, and continuing the reaction until at least about 85 percent of tertiary amines are obtained.

3. The method of claim 2, wherein the ammonia is introduced into the reaction as a gas.

4. The method of preparing aliphatic tertiary amines, which contain from 6–26 carbon atoms in each aliphatic group, which comprises reacting in the liquid phase an aliphatic secondary amine and an aliphatic alcohol, which aliphatic compounds contain 6–26 carbon atoms in each aliphatic group and have a vapor pressure less than water, in the presence of hydrogen and a hydrogenation catalyst at a temperature of 160–280° C. and a pressure of 100–200 pounds per square inch while circulating hydrogen through the reaction mixture, removing water from the circulating hydrogen, returning the hydrogen to the reaction mixture, and continuing the reaction until at least about 85 percent of tertiary amines are obtained.

5. The method of claim 4, wherein the aliphatic alcohol is pumped into the reaction mixture at the reaction temperature and pressure.

References Cited in the file of this patent

UNITED STATES PATENTS

| | | |
|---|---|---|
| 2,349,222 | Goshorn | May 16, 1944 |
| 2,355,356 | Young | Aug. 6, 1944 |
| 2,365,721 | Olin et al. | Dec. 26, 1944 |
| 2,456,599 | Smith | Dec. 14, 1948 |
| 2,953,601 | Whitaker | Sept. 20, 1960 |

OTHER REFERENCES

Degering: "Organic Nitrogen Compounds" (1950), page 204.